United States Patent [19]
Fok et al.

[11] Patent Number: 5,790,816
[45] Date of Patent: Aug. 4, 1998

[54] APPARATUS FOR TRANSFERRING INFORMATION FROM A BUS TO A NETWORK WITHOUT THE USE OF PROTOCOL ENGINES

[75] Inventors: Simon Fok, Milpitas; Kon Leong, Mountain View, both of Calif.

[73] Assignee: Gigalabs, Inc., Sunnyvale, Calif.

[21] Appl. No.: 711,093

[22] Filed: Sep. 9, 1996

[51] Int. Cl.$^6$ .................................................. G06F 13/38
[52] U.S. Cl. ...................... 395/309; 395/308; 395/200.8; 395/200.83
[58] Field of Search ...................... 395/309, 308, 395/286, 200.65, 200.69, 200.8, 200.83

[56] References Cited

U.S. PATENT DOCUMENTS 5,640,386   6/1997   Wiedeman ............................... 370/320

*Primary Examiner*—Ayaz R. Sheikh
*Assistant Examiner*—Ario Etienne

[57] ABSTRACT

Apparatus for transferring information in like digital format from a bidirectional peripheral component interconnect first bus to a network switch while eliminating use of network protocols.

5 Claims, 2 Drawing Sheets

APPARATUS FOR TRANSFERRING INFORMATION FROM A BUS TO A NETWORK WITHOUT THE USE OF PROTOCOL ENGINES

BACKGROUND OF THE INVENTION

Protocol engines are a series of programs, routines and subroutines which define how disparate machines can interoperate and within what boundaries that interaction can take place. In transferring digital information between a peripheral component interconnect [PCI] bus to a network switch, protocol engines are conventionally used.

When such information is transferred at high bit rates, as for example when information in parallel bit form is transported along the bus at a rate of 1056 megabits per second and is delivered to a switch which is adapted to receive or transmit information at 1600 megabits per second, the use of protocol engines slows down the rate of information transfer, since network protocol engines process information at a much slower rate, for example at 100 megabits per second.

More particularly, in a conventional known system, information is delivered from the bus via a first protocol engine, a first transceiver, a second bus, a second transceiver, and a second protocol engine to the switch at the rate of 100 megabits per second, although the second bus has the capability of transporting information at the rate of over 1000 megabits per second if the protocol engines were not utilized.

SUMMARY OF THE INVENTION

The present invention is directed toward systems of the character indicated wherein the use of protocol engines is eliminated and the systems are otherwise unchanged. Consequently the speed of operation is sharply increased and the costs of the system are sharply reduced. In the known system, information is transferred in the same digital format from a bidirectional peripheral component interconnect first bus to a network switch in the following manner.

Information is transferred from the first bus in bidirectional manner from a bus interface to a first protocol engine. This information is also transferred in bidirectional manner via a first buffer controller and a first buffer memory to the first protocol engine. The first protocol engine is connected in bidirectional manner to a first transceiver. The first transceiver is connected in bidirectional manner to one end of a second bidirectional bus.

A second transceiver is connected in bidirectional manner to the other end of the second bus. The second transceiver is connected in bidirectional manner to a second protocol engine. The second protocol engine is connected in bidirectional manner to a switch interface. The second engine is also connected in bidirectional manner via a second buffer memory and second buffer controller to the switch interface. The switch interface is connected in bidirectional manner to the network switch.

In accordance with the principles of the present invention, information is transferred in like digital format from a bidirectional peripheral component interconnect first bus to a network switch. More particularly, information is transferred from the first bus in bidirectional manner from a bus interface to a first transceiver. This information is also transferred in bidirectional manner via a first buffer controller and a first buffer memory to the first transceiver. The first transceiver is connected in bidirectional manner to one end of a second bidirectional bus.

A second transceiver is connected in bidirectional manner to the other end of the second bus. The second transceiver is connected in bidirectional manner to a switch interface. The second transceiver is also connected in bidirectional manner via a second buffer memory and second buffer controller to the switch interface. The switch interface is connected in bidirectional manner to the network switch.

Thus, in this invention, protocol engines are not used, with consequent advantages of speed increase and cost reduction as previously explained.

It is believed that protocol engines were previously used in systems of this kind because originally when such systems came into use, the various components did not necessarily employ the same digital format and the speeds of transmission were much slower. Consequently, the protocol engines did not appreciably slow down the speeds of transmission and the extra cost of these engines was offset by the elimination of the risks of component incompatibility.

However, there is presently no risk of component incompatibility and use of protocol engines decreases the speed of transmission and increases the costs of the system. Hence, the present invention, by eliminating use of protocol engines, permits transmission speeds to be increased and the costs of systems to be decreased without producing disadvantages of any kind.

DETAILED DESCRIPTION OF PREFERRED EMBODIMENT

Figure 1:
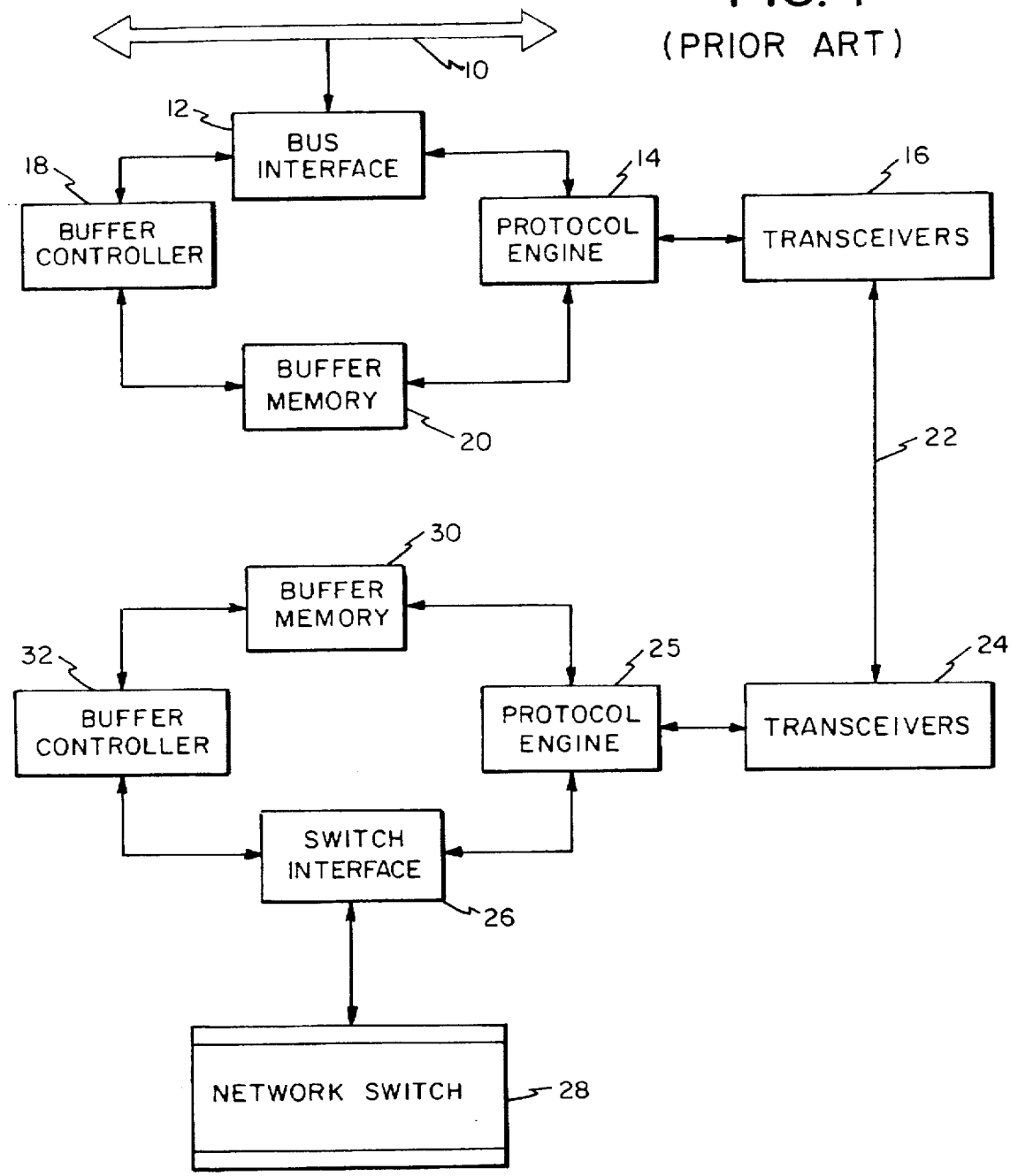
FIG. 1 is a block diagram of a prior art system illustrating use of protocol engines.

Referring first to the prior art system shown in FIG. 1, all interconnections between components are made in a bidirectional manner. All signals are processed in like parallel digital format. A bidirectional peripheral component interconnect bus 10 operating at a speed of 1056 megabits per second is connected through a bus interface 12 and a first protocol engine 14 to a first transceiver 16. The interface 12 is also connected through a first buffer controller 18 and a first buffer memory 20 to the protocol engine 14.

Tranceiver 16 is connected via a second bus 22 to a second transceiver 24. The second bus has the capacity to operate at a speed of over 1000 megabits per second but is constrained to a network protocol speed of 100 megabits per second. Transceiver 16 is connected via a second protocol engine 25 and switch interface 26 to network switch 28. The second protocol engine 25 is also connected via a second buffer memory 30 and a second buffer controller 32 to interface 26.

Figure 2:
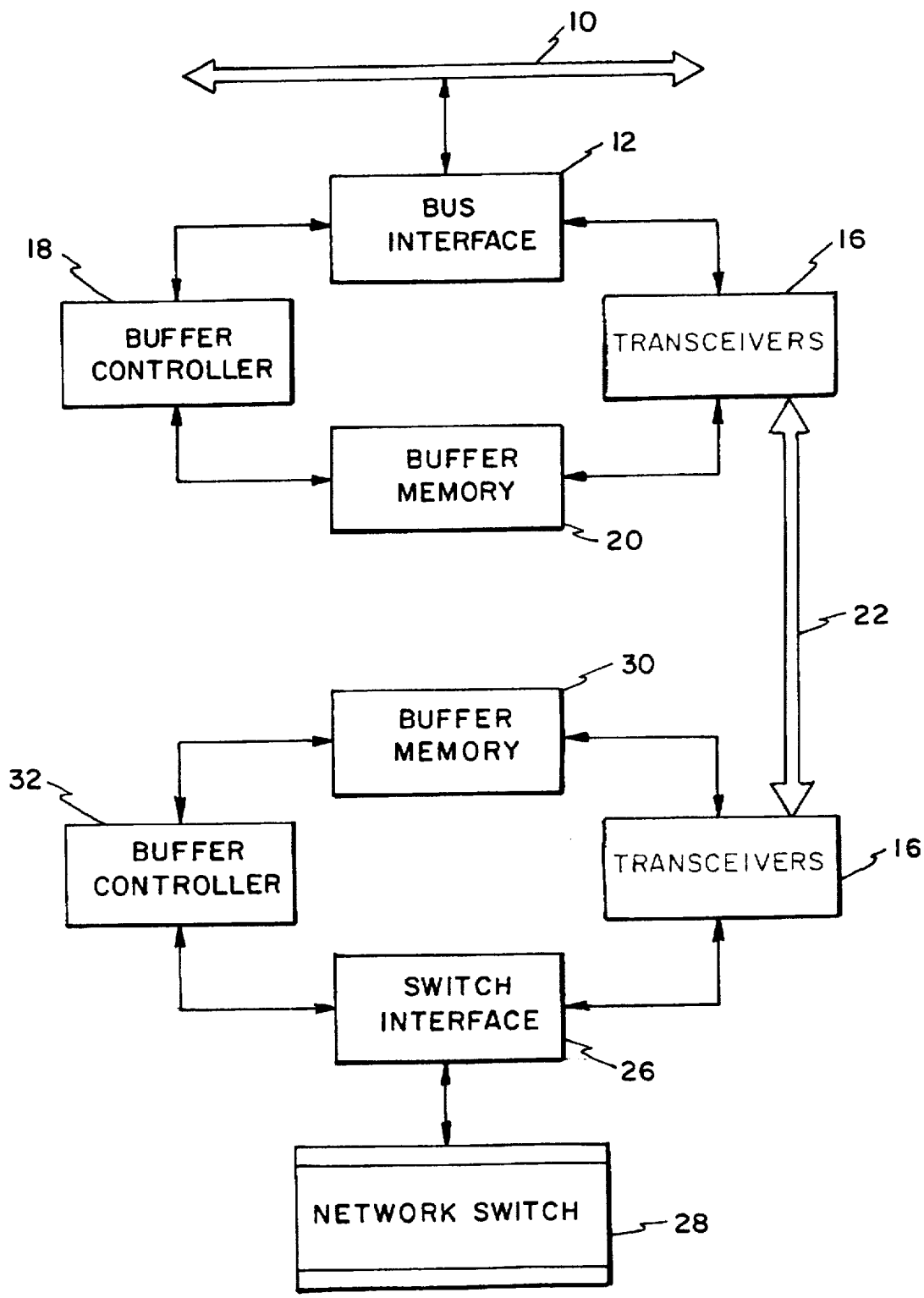
FIG. 2 is a block diagram of a preferred embodiment of the invention.

Referring now to FIG. 2, all interconnections between components are made in a bidirectional manner. All signals are processed in like parallel digital format. A bidirectional peripheral component interconnect bus 10 operating at a speed of 1056 megabits per second is connected through a bus interface 12 to a first transceiver 16. The interface 12 is also connected through a first buffer controller 18 and a first buffer memory 20 to the transceiver 16.

Tranceiver 16 is connected via a second bus 22 to a second transceiver 24. The second bus operates at a speed of 1000 gegabits per second since protocol engines are not used. Transceiver 16 is connected via switch interface 26 to network switch 28. The second transceiver is also connected via a second buffer memory 30 and a second buffer controller 32 to interface 26.

The systems shown in FIGS. 1 and 2 function as previously described.

While the invention has been described with particular reference to the drawings and detailed description of preferred embodiment, the protection sought is to be limited to the terms of the claims which follow.

What is claimed is:

1. Apparatus for transferring information in like digital format from a bidirectional peripheral component interconnect first bus to a network switch while eliminating use of network protocols, said apparatus comprising:

a bidirectional second bus having first and second opposite ends;

first and second transceivers connected respectively to the first and second ends of the second bus;

a peripheral component interconnect interface connected in bidirectional manner both to said interconnect bus and said first transceiver;

a switch interface connected in bidirectional manner both to said network switch and said second transceiver;

a first buffer memory connected in bidirectional manner to said first transceiver;

a first buffer controller connected in bidirectional manner both to said first buffer memory and to said peripheral component interconnect interface;

a second buffer memory connected in bidirectional manner to said second transceiver; and a second buffer controller connected in bidirectional manner both to said second buffer memory and said switch interface.

2. Apparatus of claim 1 wherein said digital information is processed in parallel form.

3. Apparatus as set forth in claim 2 wherein information is transferred between the switch and the switch interface at 1600 megabits per second.

4. Apparatus as set forth in claim 3 wherein information is transported along the second bus between the first and second transceivers at 1000 gegabits per second.

5. Apparatus as set forth in claim 4 wherein information is transported along the first bus at 1056 megabits per second.

* * * * *